Sept. 7, 1937.    I. CONTANT, JR    2,092,501
CAPSULE FILLING DEVICE
Filed Sept. 26, 1936
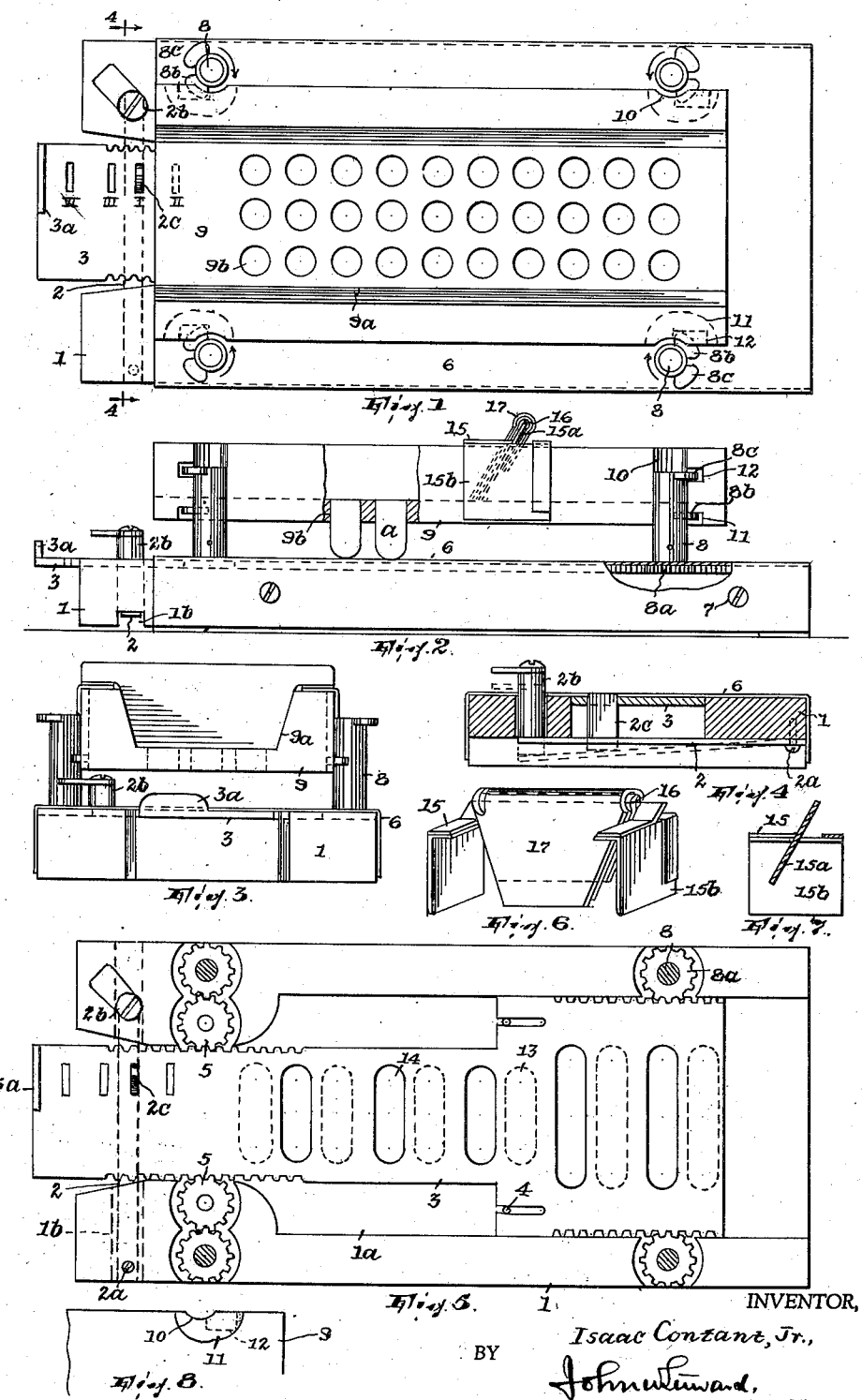
INVENTOR,
Isaac Contant, Jr.,
BY
John W. Steward,
ATTORNEY.

Patented Sept. 7, 1937

2,092,501

UNITED STATES PATENT OFFICE 2,092,501

CAPSULE FILLING DEVICE

Isaac Contant, Jr., Rochelle Park, N. J.

Application September 26, 1936, Serial No. 102,783

8 Claims. (Cl. 226—40)

This invention relates to devices for use by pharmacists and others in filling the bodies of capsules and affixing thereto their caps. The object of the invention is to provide a device of this character which shall be simple in construction and by which the filling and capping operations may be performed with facility and expedition.

The device comprises a base structure and a grid structure to be supported above the base structure and which is to contain the capsule bodies and which, after such bodies have been filled with the powder, is permitted to fall so that when the filled bodies thereupon contact with the base they will be left protruding above the grid to permit their caps to be applied. So much is not broadly new. The invention, however, contemplates the employment of novel mechanism for supporting the grid on the base until the filling of the capsule bodies has been accomplished and then to free the grid to permit it to fall. It also contemplates so constructing said mechanism that it may be made to lock the grid to the base before the filling has been accomplished and also after the grid has been allowed to fall and the caps of the capsules are ready to be applied.

The invention also contemplates a novel gage assembled with the grid and whereby to reduce the effective area of the grid to substantially an area comprising only those holes therein which correspond in number to the number of capsule bodies which at any time it is necessary to fill and cap.

In the drawing,

Fig. 1 is a plan of the device;

Fig. 2 is a side elevation thereof, with parts in section;

Fig. 3 is a left-hand elevation;

Fig. 4 is a section on line 4—4, Fig. 1;

Fig. 5 is a plan of the base and rack, with the cover removed and the rotary pillars shown in section;

Fig. 6 is an isometric view of a certain gage and Fig. 7 a longitudinal sectional view of the slide of such gage; and Fig. 8 is an underneath fragmentary plan of the capsule grid.

There is a base 1 formed by a rectangular block having a top longitudinal groove 1a reduced at one end and an underneath transverse groove 1b in which latter is secured, as at 2a, a plate-spring 2 having at its free end a knob 2b and a lug 2c, both protruding upwardly through the base. The spring with its lug forms a detent. In the groove 1a is arranged to slide a rack 3 whose illustrated wide and narrow parts respectively occupy the wide and narrow parts of the groove, such parts of the rack being toothed at both sides. The left-hand movement of the rack is limited by pins 4 on the base engaging slots 5 in the rack, as shown; its right-hand movement is limited by the upstanding grip 3a thereof engaging the cover (to be referred to) of the base. The rack also has four equally spaced notches I, II, III, and IV to receive lug 2c and hold the rack against endwise displacement. The base has journaled in suitable countersinks therein and engaged with the teeth of the narrow part of the rack a pair of pinions 5 for a purpose to appear.

6 is an oblong plate forming a cover for the base, rack and pinions and having its long edge portions bent down and secured by screws 7 to the sides of the base. In this cover are journaled four rotary elements each comprising a pillar 8 seated on the cover and a pinion 8a under the cover, each pillar being thus confined against axial displacement. The pinions of the two right-hand pillars mesh with the teeth of the wide part of the rack whereas those of the left-hand pillars mesh with the pinions 5; the pinions 5 and 8a are all of the same diameter. If the rack is moved in either direction the pillars of either pair (right or left) will rotate reversely to each other and also reversely to those of the other pair. Each pillar has two projections as fins 8b and 8c, arranged at different elevations and also in different radii—about 90° apart.

The base and cover form what I term the base structure.

9 is a capsule grid structure or grid, being a block of trough shape or with a longitudinal top dove-tailed groove 9a having a flat floor or bottom surface, the block within the area of such surface having holes 9b in which the capsule bodies a are to be snugly fitted. Its width is somewhat greater than the spacing of the pillars and it has part-cylindrical recesses 10 formed in its long sides to receive the pillars. Adjoining each recess at its under side there may be a clearance cut-out 11 and in its side is a notch 12, the cut-out and notch being spaced vertically the same as the fins 8b—8c of each pillar.

There will be provided a set of grids for each base structure, all having their portions 10, 11, and 12 formed and arranged alike but having their capsule holes of different sizes to suit various-sized capsule bodies and their grooves 9a usually of different widths.

The clearance cut-outs 11 may have varying vertical depths according to the height of the capsule bodies; in fact, in the case of capsule bodies of the larger heights they may be omitted since then the under side of the grid will be above the plane of these fins.

Operation: As will appear the fins 8b serve to support the grid when it is first assembled with the base structure and until the capsule bodies have been filled. For this purpose the operation may involve only two movements of the rack, or to its positions designated hereafter first and third. The rack is moved to and held by the detent (Fig. 1) engaged in notch I, its first position, where the fins 8b have been turned contrary to the arrows and are directed somewhat inwardly, sufficiently to support the grid, which is then rested on these fins, its holes filled with the capsule bodies, the powder to fill the latter placed on the floor of the grid and with a spatula worked into them and leveled off. The operator then shifts the rack until the detent engages in notch III, third position, which shifts the pillars as per the arrows so that fins 8b free the grid (each pair of fins 8b—8c then standing with the angle formed by their radii bisected by a vertical transverse plane) and allow it to fall or be pushed down to cause the base structure to displace the capsule bodies upwardly in the grid and leave them upwardly protruding therefrom whereby their caps may be fitted thereto, completing the operation except for removing the capped capsules from the grid.

It may be desirable, however, to lock the grid to the base structure after it is rested on the fins 8b (first position) or after it comes to rest on the base structure (third position) so that inadvertent handling (as when the operator leaves the device to attend to other duties) may not result in detaching the grid from the base structure. In the first case, after seating the grid on the fins 8b he moves the rack until the detent engages its notch at II (or the second position thereof), thus moving fins 8c into notches 12 (cut-outs 11 affording clearance for fins 8b at this time) and locking the grid against upward displacement from the base structure. In the second case, after the rack has been moved to the mentioned third position, wherefore the grid has fallen to the base structure, he moves the rack to engage the detent in its notch IV (or fourth position), the fins 8c now overhanging the top surface of the grid and thus preventing its displacement upwardly from the base structure, the fins 8b now projecting outwardly. If the movement of the rack were through its entire range (from one to the other of its second and fourth positions) the pillars would turn somewhat more than a half-revolution each, or from a position, for example, in which each fin 8c will be in its notch 12 when the grid rests on the fins 8b to a position in which such fin 8c will overhang the grid when the same rests on the base structure.

Release of any powder which might come between the rack and the cover or base may be allowed by providing transverse slots 13 and 14 in the base and rack which come into registry with each other when the rack is moved.

In case only some of the holes of the grid are to be occupied by capsule bodies and so as to confine the powder to the area occupied by such holes there is the gage shown in Figs. 2, 6, and 7. Here 15 is a sheet metal slide having an inclined mid-portion 15a and two depending sides 15b, the slide being adapted to fit snugly over the grid so as to be shiftable therealong to expose more or less of the grid holes. There are two blades 16 and 17 each folded upon itself and blade 17 straddling blade 16, thus forming a tongue which may be extended or reduced in width by sliding the blades on each other (to suit the width of the groove of the particular grid being used). Tongue 16 is fitted over or made to straddle and clamp the portion 15a of the slide.

Having thus fully described my invention what I claim is:

1. A capsule filling device comprising a base structure, a grid structure to receive and support the capsule bodies, rotary elements journaled in one structure with their axes vertical and respectively having lateral projections opposed by the other structure and supporting the grid structure above and spaced from the base structure, and means in one structure to rotate said elements to positions where the projections will be unopposed to said other structure and the grid structure may then move toward the base structure.

2. A capsule filling device comprising a base structure, a grid structure to receive and support the capsule bodies, rotary elements journaled in the base structure with their axes vertical and respectively having lateral projections supporting the grid structure above and spaced from the base structure, and means in one structure to rotate said elements to positions where the projections will clear the grid structure and the grid structure may then move toward the base structure.

3. A capsule filling device comprising a base structure, a grid structure to receive and support the capsule bodies, rotary elements journaled in one structure with their axes vertical and respectively having lateral projections opposed by the other structure and supporting the grid structure above and spaced from the base structure, means in one structure to rotate said elements to positions where the projections will be unopposed to said other structure and the grid structure may then move toward the base structure and detent means to secure the first means against movement.

4. A capsule filling device comprising a base structure, a grid structure to receive and support the capsule bodies, rotary elements journaled in one structure with their axes vertical and respectively having lateral projections opposed by the other structure and supporting the grid structure above and spaced from the base structure, and a rack movable in one structure and geared with said elements to rotate them to positions where the projections will be unopposed to said other structure and the grid structure may then move toward the base structure.

5. A capsule filling device comprising a base structure, a capsule bodies receiving and supporting structure above and spaced from the base structure, elements supporting the second named structure on the base structure and movable in sliding contact with and each in a substantially horizontal plane to a position clear of one structure to permit the second named structure to fall, and means to move said elements to said positions in unison.

6. A capsule filling device comprising a base structure, a capsule bodies receiving and supporting structure above and spaced from the base structure, elements supporting the second named structure on the base structure and intercoupling said structures against vertical displacement one from the other and movable in sliding contact with and each in a substantially horizontal plane to a position clear of one structure to permit the second named structure to fall, and means to move said elements to said positions in unison.

7. A capsule filling device comprising a base structure, a capsule bodies receiving and supporting structure above the base structure, elements intercoupling said structures against vertical displacement one from the other and movable each in a horizontal plane out of intercoupling relation to said structures, and means to move said elements to said positions in unison.

8. A capsule filling device comprising a base structure, a grid structure, and elements having projections extending therefrom and supporting the grid structure above and spaced from the base structure, said elements being rotative around vertical axes in one structure to move said projections from under the grid structure and thus permit the latter to move toward the base structure.

ISAAC CONTANT, Jr.